United States Patent [19]

Nespor

[11] Patent Number: 4,927,315

[45] Date of Patent: May 22, 1990

[54] VEHICLE LIFTING AND TOWING APPARATUS

[75] Inventor: Ronald B. Nespor, Mercer, Pa.

[73] Assignee: Chevron, Inc., Mercer, Pa.

[21] Appl. No.: 331,340

[22] Filed: Mar. 6, 1989

[51] Int. Cl.$^5$ .............................................. B60P 3/12
[52] U.S. Cl. .................... 414/563; 280/402; 212/268
[58] Field of Search ............... 414/563, 718; 280/402; 212/185, 230, 264, 267, 268

[56] References Cited

U.S. PATENT DOCUMENTS

| | | | |
|---|---|---|---|
| 3,315,821 | 4/1967 | Grove | 212/268 |
| 3,419,157 | 12/1968 | Brady | 212/268 |
| 3,462,023 | 8/1969 | Grove | 212/268 |
| 3,715,039 | 2/1973 | Kollmann et al. | 212/268 |
| 3,795,321 | 3/1974 | Johnston | 212/268 X |
| 3,837,502 | 9/1974 | Hornagold | 212/268 |
| 3,924,763 | 12/1975 | Pigeon . | |
| 4,434,902 | 3/1984 | Goode et al. | 212/268 |
| 4,460,098 | 7/1984 | Scharman | 212/268 X |
| 4,473,237 | 9/1984 | Lind . | |
| 4,473,334 | 9/1984 | Brown . | |
| 4,490,951 | 1/1985 | Mentzer et al. | 212/268 X |
| 4,557,496 | 12/1985 | Sill . | |
| 4,634,337 | 1/1987 | Hamman . | |
| 4,637,623 | 1/1987 | Bubik . | |
| 4,674,943 | 6/1987 | Nespor . | |
| 4,678,392 | 7/1987 | Capers et al. | 414/563 |
| 4,679,978 | 7/1987 | Holmes et al. . | |
| 4,793,763 | 12/1988 | Bubik . | |
| 4,797,057 | 1/1989 | Shoup et al. | 414/563 |
| 4,874,285 | 10/1989 | Bubik | 414/563 |

FOREIGN PATENT DOCUMENTS

| | | | |
|---|---|---|---|
| 1900820 | 8/1969 | Fed. Rep. of Germany | 212/268 |
| 1558656 | 2/1969 | France | 212/268 |
| 54-31156 | 3/1979 | Japan | 212/268 |

OTHER PUBLICATIONS

Century, New Formula I Duplex Tilt, Century Duplex Tilt Advantages: (Brochure).
Challenger I-500 Series Wheel Lifts, Towing & Recover Units (Brochure).
Century Towing and Recovery Equipment, Formula I 500 Series (Brochure).

*Primary Examiner*—David A. Bucci
*Assistant Examiner*—Robert S. Katz
*Attorney, Agent, or Firm*—Staas & Halsey

[57] ABSTRACT

A wheel lift type vehicle lifting and towing device which includes an extendible and tiltable boom having three telescoping sections for extension from the rear of a towing vehicle and means for raising and lowering the boom. The boom is extended and retracted by a pair of hydraulic cylinders mounted within the first and second boom sections. Another pair of hydraulic cylinders are pivotally mounted to the towing vehicle within the understructure thereof and the boom to tilt the boom. The means for raising and lowering, for extending and retracting and for tilting the boom all may be operated independently of each other. When the apparatus is in a storage position, it is retracted substantially out of view within the understructure of the body of the towing vehicle.

12 Claims, 7 Drawing Sheets

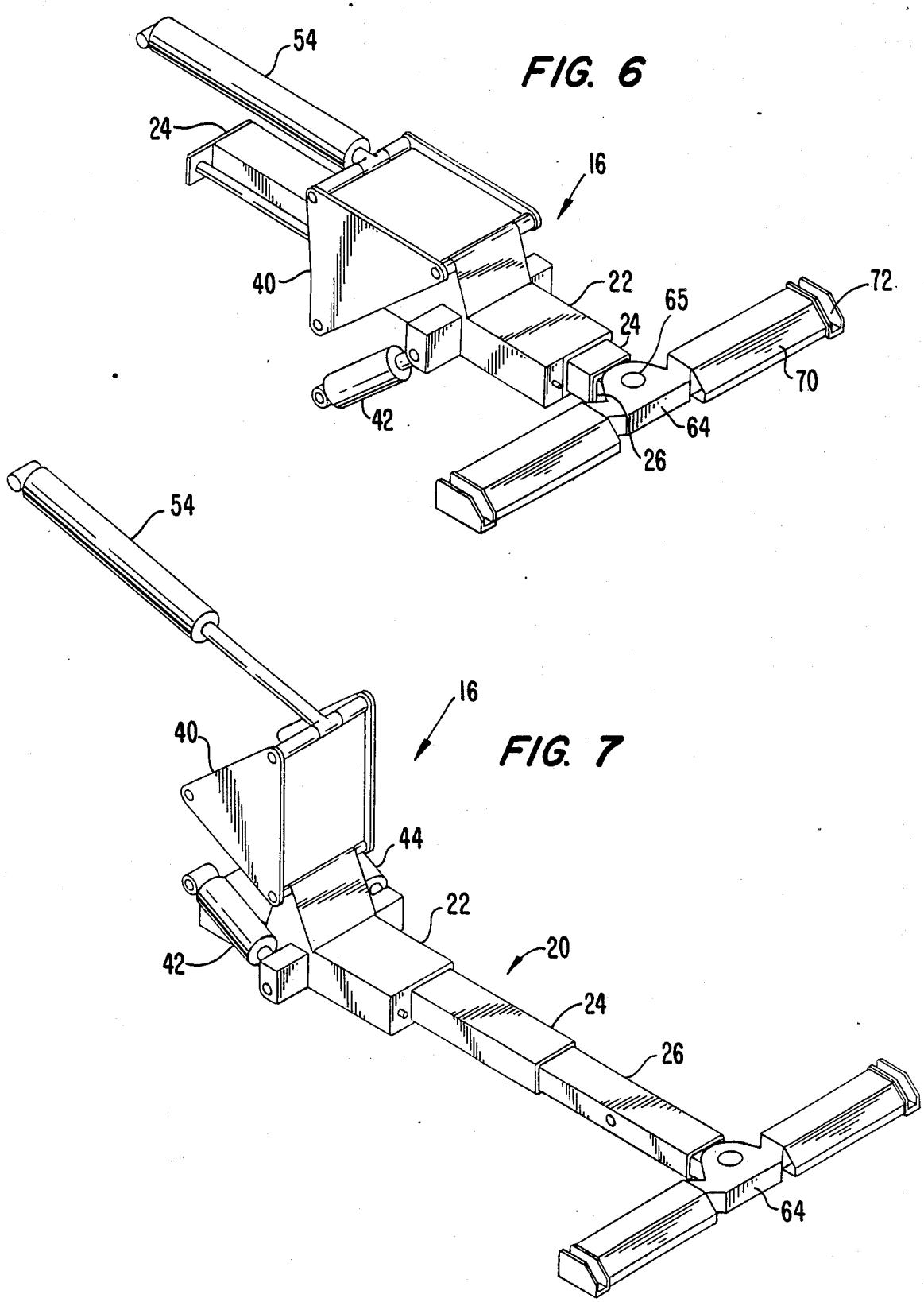

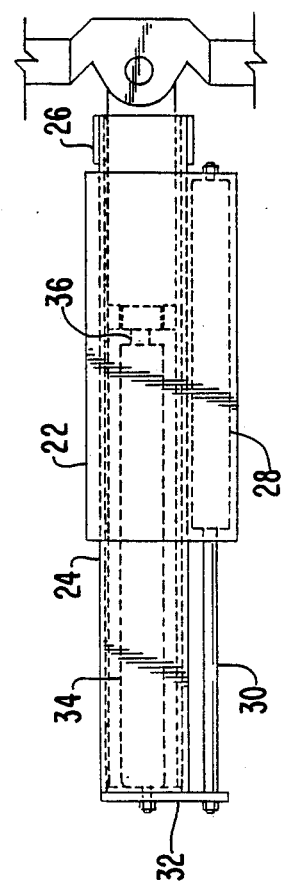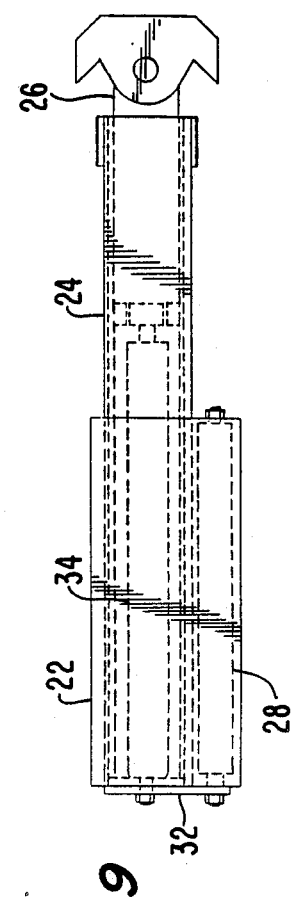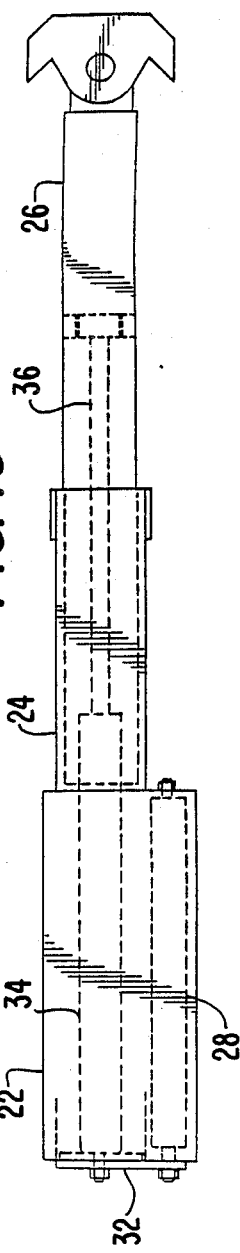

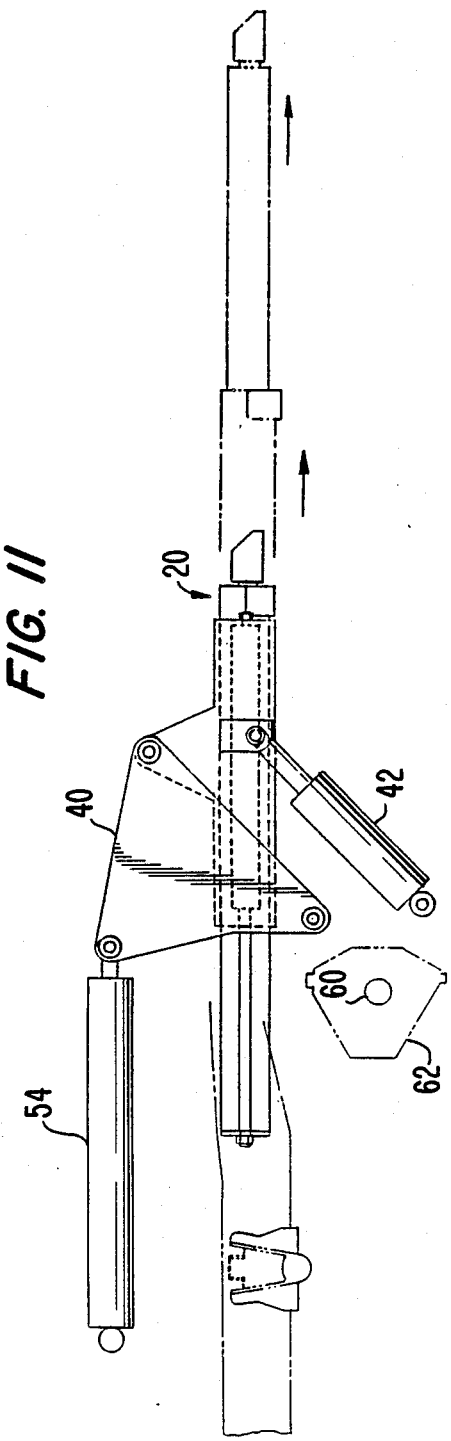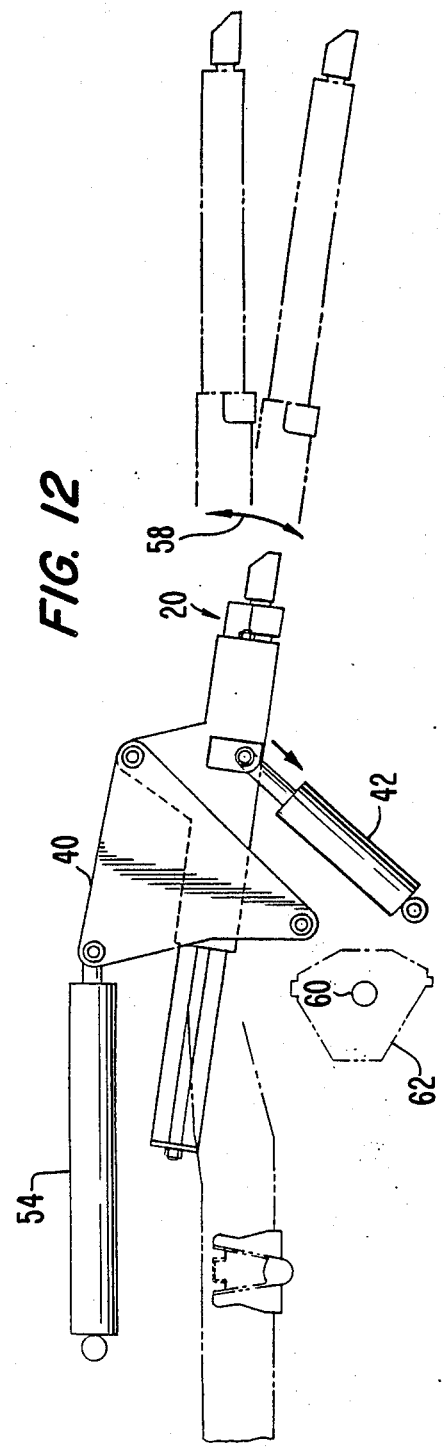

VEHICLE LIFTING AND TOWING APPARATUS

BACKGROUND OF THE INVENTION

1. Field of the Invention

The present invention relates to an improved apparatus for lifting and towing vehicles and, more particularly, to such an apparatus wherein an extensible and tiltable boom extends rearwardly from a towing vehicle and is provided on the end thereof with a pair of wheel receiving members for engaging the wheels of a vehicle to be towed and then lifting and towing the vehicle by the wheels.

2. Description of the Related Art

In view of the current designs of automobiles, it is no longer possible to lift such vehicles with a winch and a cable having a hook at its end without damaging the vehicle. Accordingly, a type of vehicle towing and lifting apparatus has been developed that engages the front or rear wheels of a vehicle and then lifts the vehicle after securing the wheels of the vehicle in some form of wheel or tire receiving member.

These wheel lift type towing and lifting device generally extend beyond the rear of the body of the towing vehicle, thus creating not only an unsightly appearance but often constituting a safety hazard. In addition, many of such devices while in a storage position preclude the use of conventional hoisting apparatus of the towing vehicle. Still other wheel lift devices employ a cradle which engages the wheels of a vehicle and is lifted by a boom on the towing vehicle. In still other prior art wheel lift towing and lifting devices, a cumbersome apparatus is required to engage the wheels or tires of a vehicle to be towed.

SUMMARY OF THE INVENTION

It is an object of the present invention to provide a wheel lift type vehicle towing and lifting apparatus that can be attached to the understructure of a towing vehicle and which may be extended out into an operative position to engage the wheels of a vehicle to be lifted and towed but which may be conveniently retracted out of sight into a storage position within the understructure of the body of the towing vehicle when not in use.

It is another object of the present invention to provide a wheel type vehicle lifting and towing apparatus which has a boom moveable between a storage position and an extended operating position and which is also tiltable while in a storage position or an extended operating position.

It is a further object of the present invention to provide a wheel lift type vehicle lifting and towing apparatus which does not interfere with the normal operation of a conventional hoisting crane mounted on the towing vehicle.

It is still another object of the present invention to provide a wheel lift type lifting and towing apparatus which has a boom with three telescopic sections which are extended and retracted by a pair of hydraulic cylinders mounted within the boom and which may be extended farther than usual from the rear end of the towing vehicle but which yet has sufficient overlap between the boom sections to permit smooth extension and retraction of the boom sections without binding when supporting a vehicle.

It is a still further object of the present invention to provide a wheel lift type lifting and towing apparatus which includes a boom and separate means for extending and retracting the boom, means for raising and lowering the boom and means for tilting the boom, all of which means may operate independently of each other.

The present invention achieves the above objects by providing a wheel lift type lifting and towing apparatus for attachment to the rear of the body of a towing vehicle. The wheel lift apparatus includes an extendible boom pivotally mounted to the vehicle and having three telescoping sections which fit one within the other. A pair of wheel receiving members are attached to the end of the boom. Means are also provided for tilting the boom at an angle to the horizontal and for moving the boom between a storage position wherein the boom is confined substantially within the understructure of the vehicle and an operating position wherein the boom extends out from the rear of the vehicle. The means for moving the boom include a first hydraulic cylinder mounted to a first boom section and connected to a second boom section telescopically received in the first boom section to extend and retract the second boom section and a second hydraulic cylinder mounted in the second boom section and connected to a third boom section telescopically received in the second boom section to extend and retract the third boom section. The means for tilting the boom include a pair of hydraulic cylinders pivotally mounted to the towing vehicle within the understructure thereof and the boom.

These, together with other objects and advantages which will be subsequently apparent, reside in the details of construction and operation as more fully hereinafter described and claimed, reference being made to the accompanying drawings forming a part hereof, wherein like numerals refer to like parts throughout.

BRIEF DESCRIPTION OF THE DRAWINGS

FIG. 6 is a perspective view showing the essential elements of the lifting and towing apparatus in a retracted position;

FIG. 7 is a perspective view showing the essential elements of the lifting and towing apparatus in an extended position;

FIGS. 8, 9 and 10, are top plan views of the boom assembly of the present invention showing the boom in a retracted, storage position, a partially extended position and a fully extended position, respectively;

FIG. 11 is a side elevation view of the boom assembly of the present invention with the movement of the boom as it is extended outwardly shown in dotted lines;

FIG. 12 is a side elevational view of the boom assembly of the present invention with the arrows showing the manner in which the boom may be tilted in either a retracted or extended position;

DESCRIPTION OF THE PREFERRED EMBODIMENTS

Figure 1:
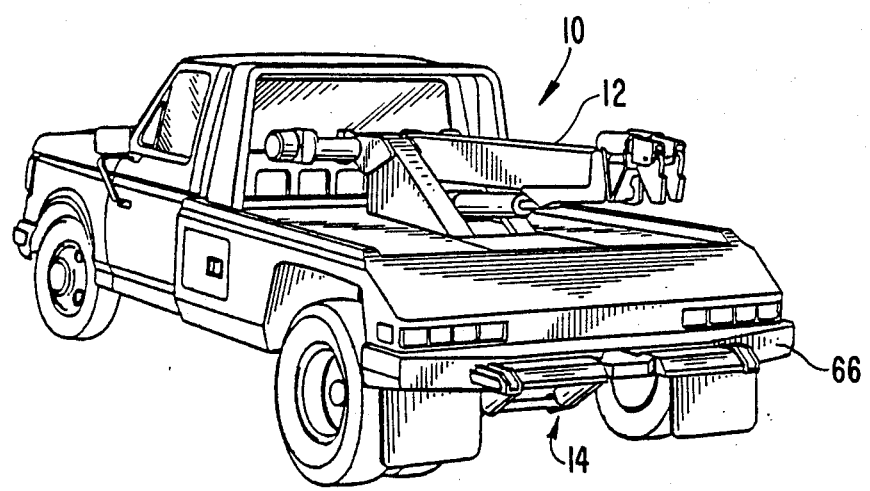
FIG. 1 is a perspective view of the rear of a tow truck provided with a wheel lift type lifting and towing apparatus according to the present invention showing the apparatus in its retracted, storage position substantially within the understructure of the towing vehicle.
Figure 2:
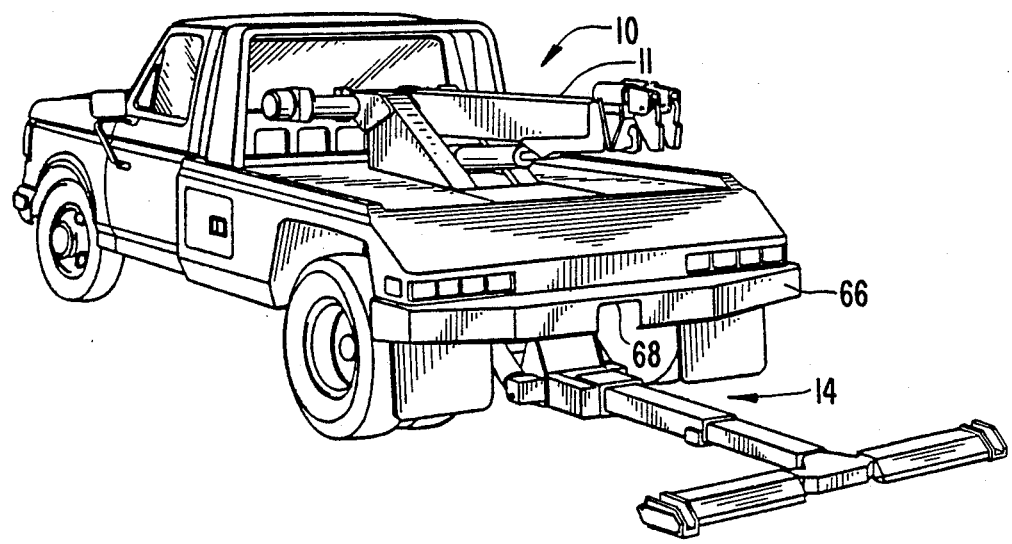
FIG. 2 is a perspective view of the rear of a tow truck showing the lifting and towing apparatus of the present invention extended outwardly from the rear of the vehicle.

Referring to the drawings, shown in FIGS. 1 and 2 is a towing vehicle or truck 10 having a conventional crane or hoist 12 pivotally mounted to the top of the front portion of the subframe of the truck and which may be tiltably raised and lowered. Attached to the understructure of the body of the towing vehicle adjacent the rear end thereof is a wheel lift type vehicle lifting and towing apparatus generally indicated by the numeral 14. In FIG. 1 the apparatus is shown in a retracted storage position whereby the crossbar, to be discussed hereafter, abuts the rear bumper of the tow truck. In FIG. 2 the lifting and towing apparatus is shown in a downward extended position. In both FIGS. 1 and 2, the tire retaining L-shaped arms, to be described later, have been removed.

Referring to FIGS. 6 through 13, the lifting and towing apparatus 14 of the present invention comprises a boom assembly, generally indicated by the numeral 16, pivotally attached to a subframe assembly 18 (shown in FIG. 13) mounted to the towing vehicle 10. The boom assembly 16 includes a telescoping boom 20 having three telescoping sections 22, 24 and 26. The sections are all rectangular in cross-section with the first boom section 22 being larger in cross-section than the second boom section 24 and the second boom section 24 in turn has a larger cross-section than the third boom section 26 whereby the three boom sections are slidably or telescopically received one within the other. During extension and retraction of the boom sections, the first boom section 22 remains stationary with respect to the second and third boom extensions 24 and 26 with the second boom extension 24 being slidably received in the first boom section 22 and the third boom section 26 being slidably received within the second boom section 24.

As best shown in FIGS. 8-10, a first hydraulic cylinder 28 is mounted at its base end to the rear end of the first boom section 22 and has a piston rod 30 extending outwardly therefrom with the piston rod being attached to a plate 32 extending outwardly from the end of the second boom section 24. A second hydraulic cylinder 34 is mounted within the second boom section 24 and is attached at its base end to plate 32 and has a piston rod 36 connected at its rod end to approximately the mid portion of the third boom extension 26.

Figure 5:
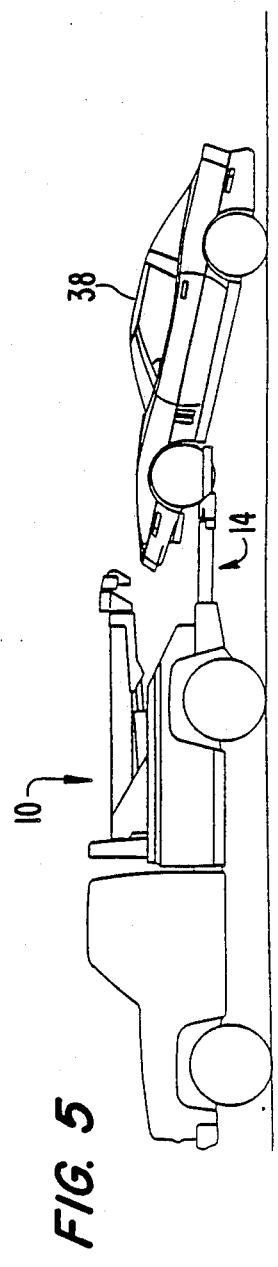
FIG. 5 is a side elevational view showing the vehicle lifting and towing apparatus in position towing a vehicle.

When the boom is in its closed, storage position as shown in FIG. 8, the piston rod 30 is fully extended out from cylinder 28. When cylinder 28 is activated to retract piston rod 30, the second boom section 24 slides through the first boom section 22 to extend outwardly therefrom as shown in FIG. 9. In this first stage of extension, the boom 20 extends outwardly from the rear end of the towing vehicle 10 far enough so that the boom is in the proper position to tow a vehicle 38 as shown in FIG. 5. When the boom is at the end of the first stage of extension, the boom sticks out sufficiently to permit turning without having the vehicle 32 contact the rear end of the towing vehicle 10. As shown in FIG. 10, when the second hydraulic cylinder 34 is activated to extend piston rod 36 outwardly therefrom, the third boom extension 26 is moved to its outermost second stage position. Similarly, when piston rod 36 is retracted the third boom section 26 is moved backwardly to its position inside of the second boom section 24 and when hydraulic cylinder 28 is actuated to extend piston rod 30 therefrom, the second boom section 24 is moved to its innermost position.

The above described boom arrangement permits the boom to be extended through the use of the two hydraulic cylinders mounted therein farther than normal. The boom may be extended a total of 67 inches from the rear of the vehicle as opposed to 63 inches or less of other wheel life type devices. Moreover, the above arrangement permits the telescoping section to have sufficient overlap that they do not bind during extension and retraction of the boom while loading a vehicle. The first boom section 22 overlaps the second boom section 24 by approximately 28.5 inches while the second boom section 24 overlaps the third boom section 26 by approximately 22 inches. A 12 inch overlap between two boom sections is typical in other prior art wheel lift devices.

The boom assembly 16 is pivotally mounted to subframe assembly 18 (shown in FIG. 13) by means of a pivoting triangular arm 40 and a pair of third and fourth hydraulic cylinders 42 and 44. Subframe assembly 18 is fixedly attached to the frame of the towing vehicle 10.

Figure 13:
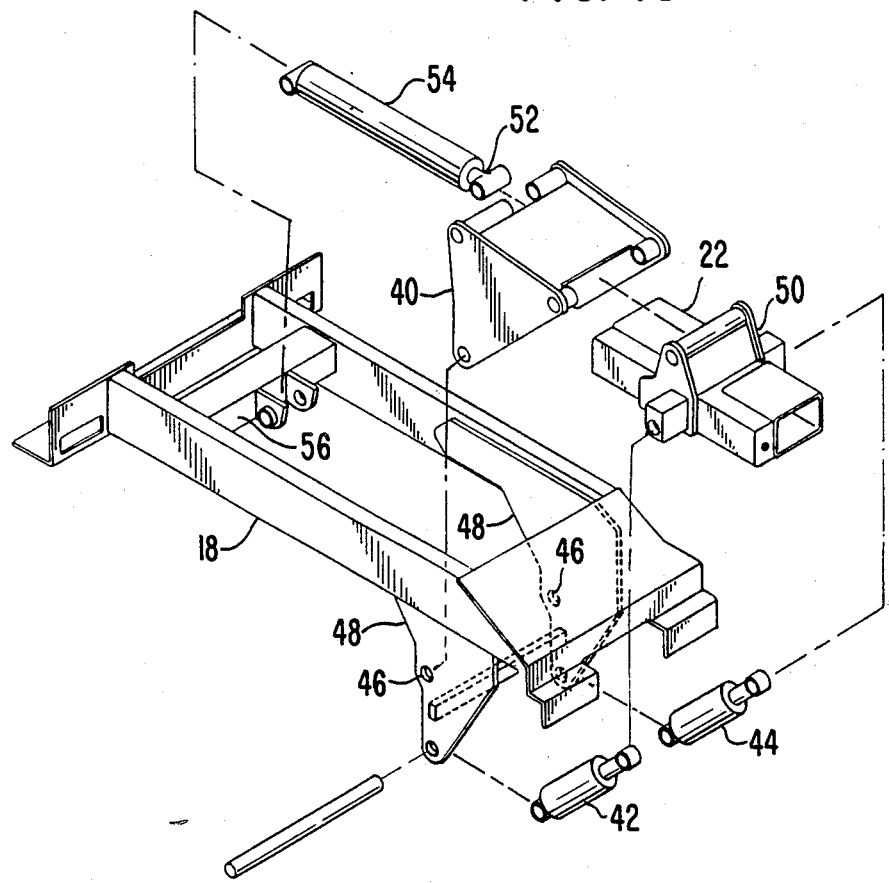
FIG. 13 is a perspective view showing the subframe of the apparatus of the present invention and the manner in which the hydraulic controls and mountings for the boom are attached to the subframe.

As shown in FIG. 13, triangular arm 40 is pivotally attached at the bottom at pivot points 46 to plates 48 of the subframe assembly 18. The upper front portion of triangular arm 40 is pivotally connected to upstanding hub 50 mounted on top of the first boom section 22. The back upper portion of triangular arm 40 is pivotally connected to piston rod 52 of a two-way hydraulic cylinder 54. Cylinder 54 is pivotally connected at its base end to cross brace 56 forming part of the subframe assembly 18. Both third and fourth hydraulic cylinders 42 and 44 are pivotally connected at their base ends to the plates 48 of the subframe assembly 18 and at their rod ends are pivotally connected to the sides of the first boom section 22.

With this arrangement, extension of the piston rod 52 pivots triangular arm 40 forwardly to lower the boom and retraction of the piston rod 52 causes the triangular arm to pivot backwardly to raise the boom 20. Correspondingly, extension and retraction of the piston rods of the third and fourth hydraulic cylinders 42 and 44 causes the boom 22 to angularly tilt both above and below the horizontal. The boom may be tilted through an overall arc of approximately 10° as shown by arrow 58 in FIG. 12.

As best shown in FIGS. 11 and 12, the boom assembly 20 is mounted to subframe assembly 18 at a point just behind the rear axle 60 of the towing vehicle whereby the boom 20 is in a raised position sufficiently high to clear the rear differential 62 of the towing vehicle. With this arrangement, the boom 20 can be retracted inwardly without contacting the differential so that the crossbar 64 of the boom assembly abuts the rear bumper 66 of the towing vehicle 10 as shown in FIG. 1. The rear bumper 66 is provided with a cut-out or notch 68 as shown in FIG. 2 to accommodate the outer end of the boom 20 when the boom is in its retracted, storage position. Moreover, the rear bumper is tapered forwardly adjacent its outer ends to provide greater clearance between the bumper and a vehicle being towed to facilitate turning while towing the vehicle without having the vehicle contact any part of the tow truck.

The above described lifting and towing apparatus affords many significant advantages. In addition to the fact that the boom assembly may be retracted within the understructure of the towing vehicle uptight against the rear bumper of the vehicle, the means for raising and lowering the boom, the means for extending the boom and the means for tilting the boom all may be operated independently of each other. Thus, when the boom assembly is in an uptight storage position, the end of the boom and the crossbar may be tilted downwardly and out of the way while the boom is still in a retracted position to permit use of other towing apparatus such as a tow sling. Moreover, with the arrangement described above, the various hydraulic hoses (not shown) connected to the hydraulic cylinders travel the same distance when the boom is moved in and out as they do when the boom is moved up and down. This makes it convenient to route the hoses and to use shorter hoses that are less likely to become tangled in other parts of the apparatus and tow truck.

Figure 14:
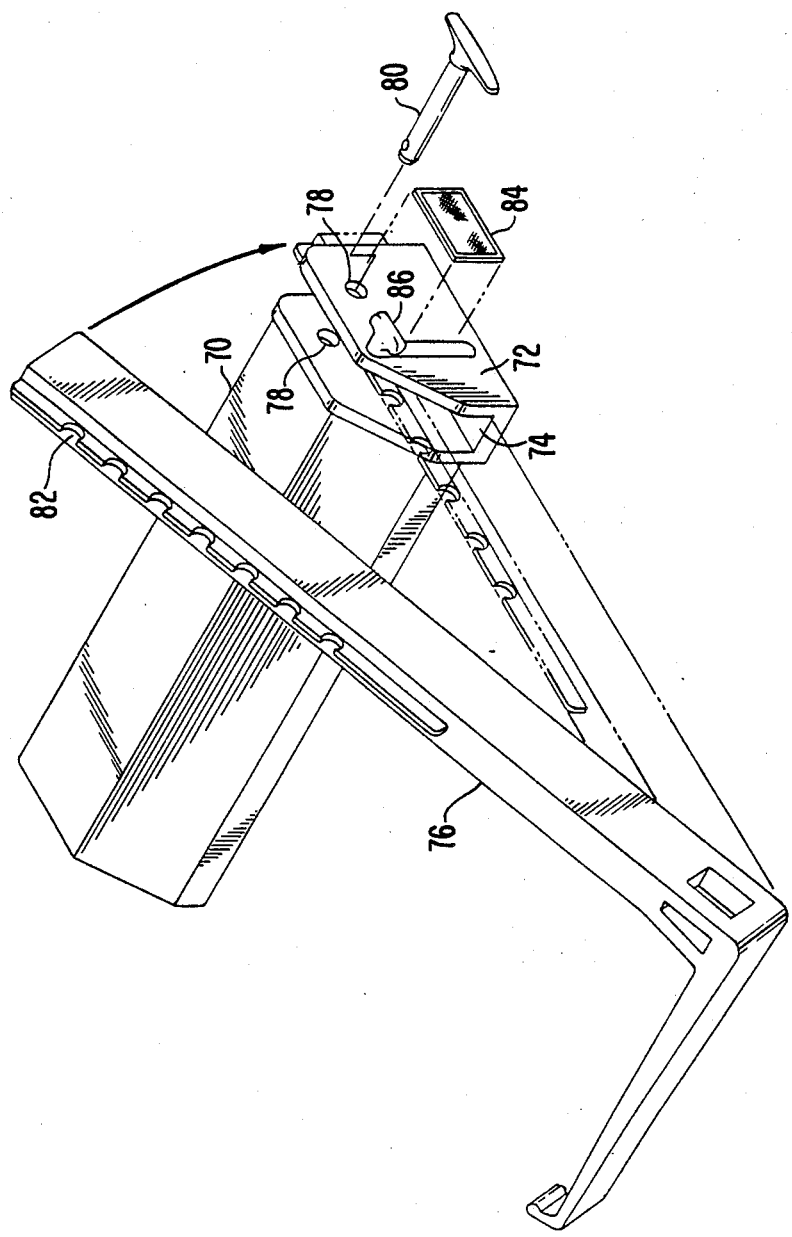
FIG. 14 is a perspective view showing the parts of the wheel retaining members of the present invention.

Any suitable wheel retaining device may be mounted on the crossbar 64 to engage the wheels of a vehicle to be towed. Crossbar 64 is pivotally connected to the outer end of the boom at pivot point 65 as shown in FIG. 6. As best shown in FIG. 14, a suitable wheel retaining device includes a sleeve 70 mounted on each end of the cross arm 64 so as to be adjustable inwardly and outwardly along the crossbar to accommodate cars of varying widths. Each sleeve 70 has a generally U-shaped, open topped shoe 72 rigidly mounted at its outer end. Each shoe has a channel or slot 74 therein to receive an arm of an L-shaped tire retaining member 76. The end of the L-shaped tire retaining member 76 received in the slot 74 of the shoe 72 is provided with a plurality of spaced, semi-circular notches 82 on the upper edge thereof. Each side wall of the shoe 72 is provided with a hole 78 to receive a pin 80 which may be inserted therethrough to lock the tire retaining member 76 in place within the shoe. When the notched end of the tire retaining member 76 is inserted into the slot 74 of the shoe, one of the notches 82 is placed in alignment with the holes 78 and pin 80 is then inserted through the openings and the notch to securely lock the tire retaining member in place when towing a vehicle. The outer wall of each shoe 72, may be provided with a reflector 84 and a hook 86 to which a tire safety strap may be attached.

Figure 3:
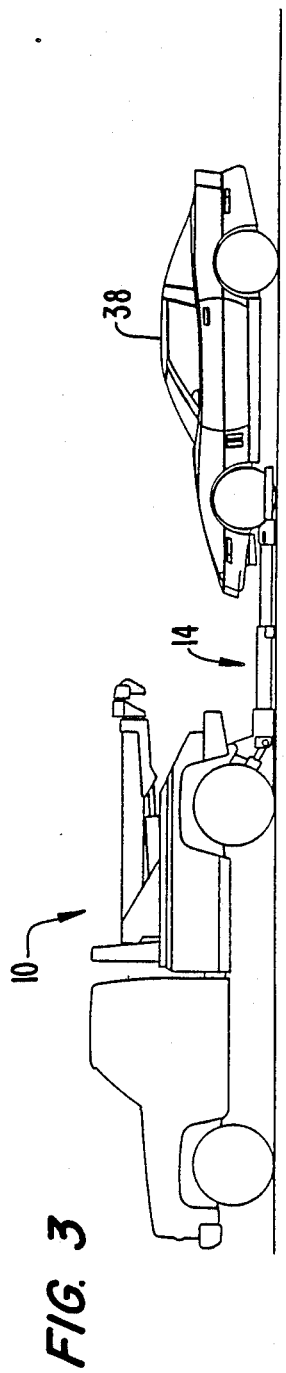
FIG. 3 is a side elevational view showing the vehicle lifting and towing apparatus extended on a surface and in engagement with the tires of a vehicle.
Figure 4:
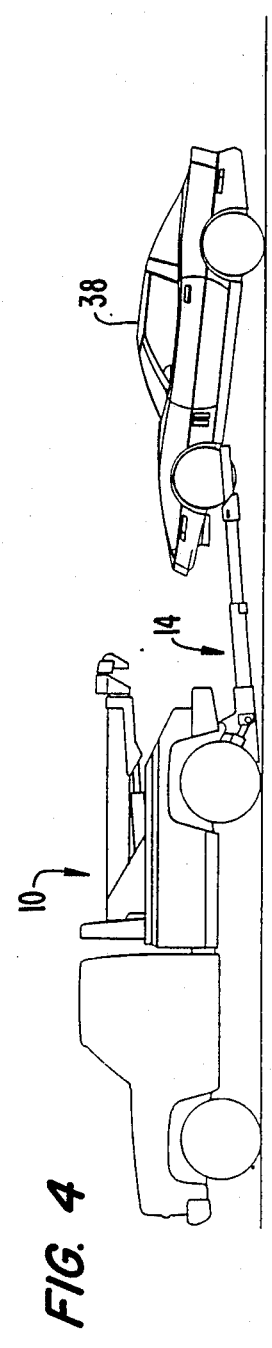
FIG. 4 is a side elevational view of the lifting and towing apparatus fully extended in a raised and upwardly tilted position while lifting the vehicle.

In operation of the vehicle lifting and towing apparatus of the present invention, a shown in FIGS. 3-5, the towing vehicle is positioned in front of a vehicle to be towed and the boom assembly is lowered. The boom is extended so that the back of each sleeve abuts against the front of a tire of the vehicle. The tire retaining members are then inserted into the shoes and locked in place and the boom raised and/or tilted to a desired position and then retracted to the first stage towing position for towing a vehicle as shown in FIG. 5. When the apparatus is not in use, the tire retaining members are removed from the shoes and stored on the towing vehicle and the boom is retracted to a storage position within the understructure of the vehicle body as shown in FIG. 1.

Suitable control means may be provided either in the cab of the towing vehicle or at the rear end of the body of the vehicle or in both places to control operation of the apparatus. It is also noted that since the crossbar is pivotally connected to the end of the boom, the angle of the crossbar may be adjusted to facilitate engagement of the wheels of the vehicle being towed when an angular position is required.

It is apparent from the above detailed description that many advantageous features are provided by the present invention. A vehicle lifting and towing apparatus is disclosed which, when not in use, is designed to be stored substantially out of view within the understructure of the body of the towing vehicle without any undesirable parts such as hoses, boom, wheel receiving members and the like extending out from the rear of the towing vehicle. Moreover, the wheel receiving members are easily positioned to engage the wheels of a vehicle to be towed and as well are adjustable to fit various size vehicles and tires. Moreover, the lifting device can be accurately controlled to avoid damage to the body of the vehicle being towed during operation. The boom also may be tilted downwardly when in its retracted position to facilitate use of other towing apparatus such as a tow sling. The boom can be extended farther outwardly than normal while still permitting smooth extension and retraction without binding when supporting a vehicle. Additionally, the apparatus may be incorporated into the body of a conventional towing vehicle or truck without interfering with the normal operation of the crane of the vehicle.

Numerous alterations and modifications of the structure herein disclosed will suggest themselves to those skilled in the art. It is to be understood, however, that the present disclosure relates to the preferred embodiments of the invention which is for purposes of illustration only and is not to be construed as a limitation of the invention. All such modifications which do not depart from the spirit of the invention are intended to be included within the scope of the appended claims.

I claim:

1. A vehicle lifting and towing apparatus for attachment to a towing vehicle comprising:
    an extendable boom mounted to said vehicle, said boom having three telescopic sections and a front end and a rear end;
    a pair of wheel receiving members attached to the rear end of said boom;
    means for moving said boom between a storage position wherein said boom is confined substantially within the understructure of said vehicle and an operating position wherein said boom extends out from the rear of said vehicle;
    wherein said means for moving said boom comprises a first hydraulic cylinder mounted in a first boom section and connected to a second boom section telescopically received in said first boom section to extend and retract said second boom section and a second hydraulic cylinder mounted in said second boom section and connected to a third boom section telescopically received in said second boom section to extend and retract said third boom section; and
    wherein said first cylinder has a piston rod attached to said second boom section and when said boom is in said storage position said first cylinder piston rod is in an extended position.

2. A vehicle lifting and towing apparatus as recited in claim 1, wherein said first boom section has a front end and a rear end and when said boom is in said storage position said second boom section protrudes outwardly from the front end of said first boom section.

3. A vehicle lifting and towing apparatus as recited in claim 1 which includes independently operable means for tilting said boom at an angle to the horizontal.

4. A vehicle lifting and towing apparatus as recited in claim 3, wherein said means for tilting said boom comprises third and fourth hydraulic cylinders pivotally mounted to said vehicle within the understructure thereof and said boom.

5. A vehicle lifting and towing apparatus as recited in claim 1 which includes means for raising and lowering said boom.

6. A vehicle lifting and towing apparatus as recited in claim 5, wherein said means for raising and lowering said boom includes a triangular arm pivotally attached to said vehicle within the understructure thereof and said boom, and means for pivoting said triangular arm.

7. A vehicle lifting and towing apparatus for attachment to a towing vehicle comprising:
 an extendable boom pivotally mounted to said vehicle, said boom having three telescoping sections and a front end and a rear end;
 a pair of wheel receiving members attached to the rear end of said boom;
 means for moving said boom between a storage position wherein said boom is confined substantially within the understructure of said vehicle and an operating position wherein said boom extends out from the rear of said vehicle;
 said means for moving said boom comprising a first hydraulic cylinder mounted in a first boom section and connected to a second boom section telescopically received in said first boom section to extend and retract said second boom section and a second hydraulic cylinder mounted in said second boom section and connected to a third boom section telescopically received in said second boom section to extend and retract said third section, said first cylinder and said second cylinder being operable independently of each other;
 means for tilting said boom at an angle to the horizontal, said means for tilting said boom being operable independently of said means for moving said boom; and
 means for raising and lowering said boom, wherein said means for raising and lowering said boom includes a triangular arm pivotally attached to said vehicle within the understructure thereof and said boom, and means for pivoting said triangular arm.

8. A vehicle lifting and towing apparatus as recited in claim 7, wherein said means for tilting said boom comprises third and fourth hydraulic cylinders pivotally mounted to said vehicle within the understructure thereof and said boom.

9. A vehicle lifting and towing apparatus for attachment to a towing vehicle comprising:
 an extendable boom pivotally mounted to said vehicle, said boom having three telescoping sections and a front end and a rear end;
 a pair of wheel receiving members attached to the rear end of said boom;
 means comprising a pair of hydraulic cylinders mounted within said boom for extending and retracting said boom between a storage position wherein said boom is confined substantially within the understructure of said vehicle and an operating position wherein said boom extends out from the rear of said vehicle;
 means for raising and lowering said boom;
 means for tilting said boom at an angle to the horizontal,
 wherein said means for extending and retracting said boom, said means for raising and lowering said boom and said means for tilting said boom all may be operated independently of each other; and
 wherein said means for extending and retracting said boom comprises a first hydraulic cylinder mounted in a first boom section and connected to a second boom section telescopically received in said first boom section to extend and retract said second boom section and a second hydraulic cylinder mounted in said second boom section and connected to a third boom section telescopically received in said second boom section to extend and retract said third boom section; and
 wherein said first cylinder has a piston rod attached to said second boom section and when said boom is in said storage position said first cylinder piston rod is in an extended position.

10. A vehicle lifting and towing apparatus as recited in claim 9, wherein said first boom section has a front end and a rear end and when said boom is in said storage position said second boom section protrudes outwardly from the front end of said first boom section.

11. A vehicle lifting and towing apparatus as recited in claim 9, wherein said means for tilting said boom comprises third and fourth hydraulic cylinders pivotally mounted to said vehicle within the understructure thereof and said boom.

12. A vehicle lifting and towing apparatus as recited in claim 9, wherein said first cylinder and said second cylinder are operable independently of each other.

* * * * *